US010885280B2

(12) United States Patent
Takasaki et al.

(10) Patent No.: US 10,885,280 B2
(45) Date of Patent: Jan. 5, 2021

(54) EVENT DETECTION WITH CONVERSATION

(71) Applicant: International Business Machines Corporation, Armonk, NY (US)

(72) Inventors: Kenichi Takasaki, Tokyo (JP); Shoichiro Watanabe, Tokyo (JP); Sanehiro Furuichi, Tokyo (JP); Yasutaka Nishimura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 16/190,535

(22) Filed: Nov. 14, 2018

(65) Prior Publication Data

US 2020/0151257 A1 May 14, 2020

(51) Int. Cl.
*G06F 40/30* (2020.01)
*G06F 16/9537* (2019.01)
*G10L 15/22* (2006.01)
*H04W 4/46* (2018.01)
*G10L 13/00* (2006.01)

(52) U.S. Cl.
CPC .......... *G06F 40/30* (2020.01); *G06F 16/9537* (2019.01); *G10L 15/22* (2013.01); *G10L 13/00* (2013.01); *H04W 4/46* (2018.02)

(58) Field of Classification Search
CPC ...... G06F 40/30; G06F 16/9537; H04W 4/46; G10L 13/043; G10L 15/22; G10L 13/00
USPC ...................................................... 340/425.5
See application file for complete search history.

(56) References Cited

U.S. PATENT DOCUMENTS

| 5,745,877 A  * | 4/1998  | Nijmam .................... G06F 3/16 704/270 |
| 7,949,529 B2 * | 5/2011  | Weider .................... G10L 15/22 704/270 |
| 9,224,394 B2 * | 12/2015 | Schalk .................... G10L 15/30 |
| 9,646,428 B1   | 5/2017  | Konrardy et al. |
| 9,798,799 B2 * | 10/2017 | Wolverton .............. G10L 15/22 |
| 10,209,949 B2 * | 2/2019 | Dogrultan ............... G06F 3/165 |
| 10,317,240 B1 * | 6/2019 | Di Pietro ........... G01C 21/3694 |
| 2004/0103008 A1 | 5/2004 | Wahlbin et al. |
| 2010/0248618 A1 | 9/2010 | Bai et al. |

(Continued)

OTHER PUBLICATIONS

Song, Lei, et al. "Abnormal Event Detection Based on in Vehicle Monitoring System." International Conference on Applications and Techniques in Cyber Security and Intelligence, 2017, vol. 580, Edizioni della Normale, Cham, pp. 275-280.

*Primary Examiner* — John A Tweel, Jr.
(74) *Attorney, Agent, or Firm* — Reza Sarbakhsh; Edell, Shapiro & Finnan, LLC

(57) ABSTRACT

A method, system, and computer program product are provided. At least some received event candidate information concerning a possible event is stored as an event candidate in a database. A dialogue is generated with an occupant of a vehicle located in a vicinity of the possible event to obtain and store information to resolve any insufficiency or ambiguity regarding the event candidate in the database. When the information stored in the database regarding the event candidate is determined to be sufficient and unambiguous the event candidate is made into an event in the database. The event is reported to at least one vehicle approaching a location corresponding to the event.

18 Claims, 11 Drawing Sheets

(56) References Cited

U.S. PATENT DOCUMENTS

| | | |
|---|---|---|
| 2013/0275164 A1 | 10/2013 | Gruber et al. |
| 2016/0094964 A1 | 3/2016 | Barfield, Jr. et al. |
| 2017/0357716 A1 | 12/2017 | Bellegarda et al. |
| 2019/0115016 A1* | 4/2019 | Seok ................... G10L 15/22 |
| 2019/0120649 A1* | 4/2019 | Seok ................. G01C 21/3629 |

* cited by examiner

1 …

EVENT DETECTION WITH CONVERSATION

BACKGROUND

Existing advanced drive support systems in vehicles can detect an obstacle on a road, generate an event, and notify following vehicles of the event to ensure their safety. However, if information about a detected possible event is insufficient or ambiguous, current systems are not capable of resolving the ambiguity or insufficiency such that an event could be generated. As a result, other vehicles would not be notified regarding the detected possible event.

U.S. Patent Application Publication No. 2016/0094964 relates to automatic vehicle crash detection using onboard devices. An onboard telematics device having sensors, such as an accelerometer or other sensors, may determine that a vehicle collision likely has occurred. In response to detecting a likely vehicle collision, the telematics device may alert a call center. An operator at the call center may speak to a driver of the vehicle to ask the driver whether assistance is needed. If necessary, the operator may contact an emergency response center to provide relevant information, such as a location of the vehicle collision, a potential severity of the vehicle collision, etc. Although some information may be obtained from the driver, the obtained information relies only on the driver's knowledge. Further this information is not used to notify vehicles following a vehicle suspected of being in a crash.

U.S. Patent Application Publication No. 2010/0248618 relates to a system and method for allowing vehicle occupants to wirelessly chat with each other over a dedicated short range communication (DSRC) channel. A vehicle occupant may initiate a chatting session by wirelessly transmitting a request to speak with an occupant of another vehicle nearby on a certain topic. The request and the chatting session is established and maintained in a multi-hop manner. However, the system and method do not determine an occurrence of a possible event, determine that information about the possible event is ambiguous or insufficient, and resolve the ambiguity or insufficiency such that an event can be generated and provided to other vehicles in a vicinity.

U.S. Pat. No. 9,646,428 relates to methods and systems for monitoring use of a vehicle having at least one autonomous and/or semi-autonomous operation feature to determine and respond to incidents, such as collisions, thefts, or breakdowns. Operating data from sensors within or near the vehicle may be used to determine when an incident has occurred and an appropriate response. The responses may include contacting a third party to provide assistance, such as local emergency services. In some embodiments, an occurrence of the incident may be verified by automated communication with an operator of the vehicle. An onboard computer or a mobile device may monitor and record vehicle operating data, including information regarding operation of the vehicle. A server may receive the operating data and may process this data to determine whether an incident occurred. When an incident has occurred, the server may verify the incident and request assistance for the vehicle. In one embodiment, if the vehicle is currently employing autonomous or semi-autonomous functionality, the vehicle may send a Vehicle-to-Vehicle (V2V) wireless communication to a nearby vehicle also employing the same or other type of autonomous or semi-autonomous functionality. Embodiments may remotely determine that a vehicle accident has occurred. As a result, emergency responders may be informed of the location of the vehicle accident, such as via wireless communication, and can be quickly dispatched to the accident scene. However, if information concerning the accident is missing or is ambiguous, there is no way to obtain the missing information or resolve the ambiguity such that an event may be generated and provided to nearby vehicles.

SUMMARY

According to embodiments of the present invention, a method, system and computer program product are provided for verifying and distributing information about a possible event. A computing device stores at least some received event candidate information concerning the possible event as an event candidate in a database. The computing device generates a dialogue with an occupant of a vehicle located in a vicinity of the possible event to obtain and store information to resolve any insufficiency or ambiguity regarding the event candidate in the database. The computing device makes an event in the database from the event candidate when the information stored in the database regarding the event candidate is determined to be sufficient and unambiguous. The computing device reports the event to at least one vehicle approaching a location corresponding to the event. The method, system, and computer program product provide an advantage over existing systems by recognizing when information about a possible event is insufficient or ambiguous and generating a dialogue with an occupant of a vehicle located near the possible event to ask the occupant questions in order to obtain information to resolve any insufficiency or ambiguity regarding the event candidate in the database. In this way, false events can be eliminated and event candidates can become events. When the event candidate information becomes sufficient and unambiguous, nearby vehicles can be notified regarding the event.

In some embodiments of the method, system, and computer program product, the computing device optionally collects information from the dialogue and stores the collected information regarding the event candidate in the database. As long as the information regarding the event candidate is determined to be either insufficient or ambiguous, the computing device repeatedly generates another respective dialogue with a respective occupant of another respective vehicle located in the vicinity of the possible event to obtain and store information to resolve any insufficiencies or ambiguities with respect to the event candidate. The computing device collects information from the other respective dialog. At least some of the collected information regarding the event candidate is stored in the database. Such embodiments provide an advantage over existing systems by collecting information from one or more occupants in one or more other vehicles when information provided by a previously contacted occupant does not satisfy the insufficiency or ambiguity of the event candidate information.

In some other embodiments of the method, system and computer program product, optionally, a level of detail of questions asked during the dialogue depend on a speed of the vehicle. Thus, for example, if an occupant is in a car moving at a speed higher than a particular speed, the occupant could be asked less detailed questions than an occupant of a vehicle moving at a speed below the particular speed. These other embodiments optionally take into account that the occupant in the vehicle moving at the speed higher than the particular speed has less time to observe and report observations during the dialog than an occupant of a slower moving vehicle.

In yet another embodiment of the invention, a device in a vehicle for detecting a possible event is provided. The device includes at least one processor, at least one memory connected to the at least one processor, and a sensor connected with the at least one processor. The at least one processor is configured to detect the possible event in a vicinity of the vehicle via the sensor. Event candidate information concerning the possible event is transmitted to a remote computing device. The event candidate information includes location information regarding the possible event. The at least one processor receives information regarding an event, corresponding to the possible event, from the remote computing device, where the information regarding the event includes information that resolves any insufficiencies and ambiguities regarding the transmitted event candidate information and confirmation of occurrence of the event from vehicle occupants. The device presents the information regarding the event. An advantage of this embodiment of the invention over existing systems is that the device that reports a possible event to the remote computing device may receive an event related to the possible event that resolves any insufficiencies and ambiguities regarding the transmitted event candidate information. Thus, occupants of the vehicle may receive more accurate and complete information regarding the event than what was originally reported.

In still another embodiment of the invention, a method is provided for a device within a vehicle. The device receives a request for a dialogue from a remote computing device regarding a possible event in a vicinity of a vehicle including the device. The device accepts the request for the dialogue. The device receives and presents at least one question from the remote computing device concerning the possible event in the vicinity of the vehicle. The device receives at least one answer to the at least one question from an occupant of the vehicle. The device transmits the at least one answer to the remote computing device. An advantage of this embodiment is that an occupant of a vehicle can be questioned via the device within the vehicle such that additional information regarding the possible event can be obtained and provided to the remote computing device. In this way, more complete information regarding the possible event may be collected and reported to the device.

Optionally, in the above embodiment, the method may include the device within the vehicle transmitting speed information regarding a speed of the vehicle including the device to the remote computing device, where the device receives and presents the at least one question when the vehicle is close to a location of the possible event such that the occupant of the vehicle can see the possible event. This optional variation of the above embodiment is advantageous because the occupant can provide answers to questions regarding the possible event while being able to view the possible event.

BRIEF DESCRIPTION OF THE DRAWINGS

Generally, like reference numerals in the various figures are utilized to designate like components.

DETAILED DESCRIPTION

Figure 1:
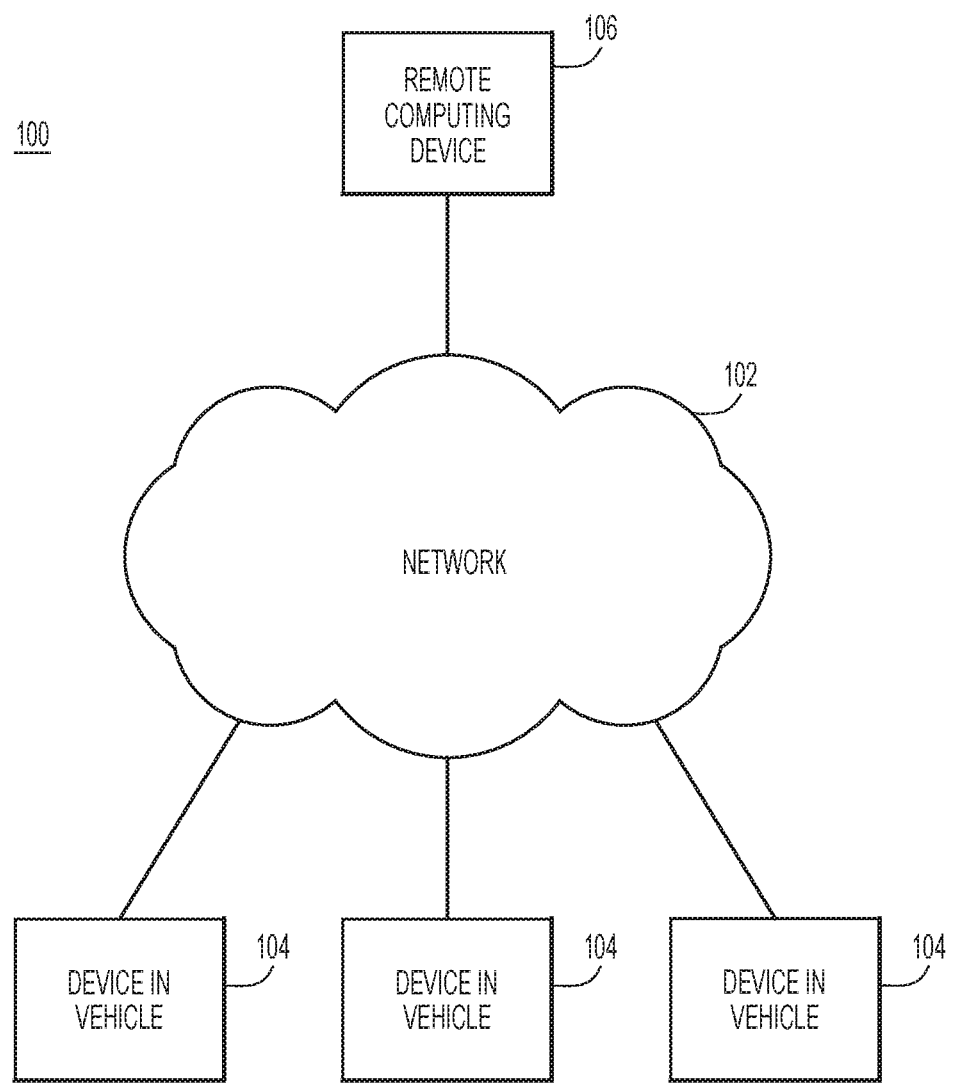
FIG. 1 shows an example operating environment in which various embodiments of the invention may be implemented.

In present invention embodiments, a device within a vehicle having one or more sensors, including, but not limited to, an image capturing device such as a camera, an accelerometer, and LIDAR (light detection and ranging), may detect a possible event on or near a road. The device may transmit event candidate information regarding the possible event to a remote computing device such as, for example, a server or other computing device.

The remote computing device may receive and store the event candidate information as an event candidate in a database. The remote computing device may determine a type of the event candidate such as, for example, a vehicle collision, an obstacle on a road, a slippery road condition, or other type of event candidate. The remote computing device then may determine whether the event candidate information is insufficient or ambiguous. This determination may depend on the determined type of the event candidate.

The remote computing device then may select a vehicle located in a vicinity of the event candidate. The term "vicinity of an event candidate" refers to an area close to a location of the event candidate. For example, "vicinity of an event candidate" may refer to a location within a specific distance of the location of the event candidate. The specific distance may be 5 miles, 3 miles, or another suitable distance. In various embodiments, different methods may be employed to select the vehicle. In some embodiments, candidate vehicles may include respective devices that periodically report a location and a speed of the respective vehicle to the remote computing device. In other embodiments, the remote computing device may broadcast a message that includes a location of the event candidate. Respective devices within vehicles may receive the broadcast, may determine whether the respective vehicles including the respective devices are traveling toward the location of the event candidate and are within a particular distance of the location of the event candidate. If so, the respective devices may respond to the broadcast by transmitting information to the remote computing device including a location of the respective vehicle and a speed of the respective vehicle.

The remote computing device may predict a probability of a respective occupant in the respective vehicles responding to questions in a dialogue with the remote computing device. The prediction may be based on past behavior of occupants of the respective vehicles regarding participation in previous dialogues. The remote computing device may select one of the respective vehicles based on the respective vehicle's location, speed and the probability of an occupant participating in the dialog.

The remote computing device may then generate at least one question for the dialogue based on the speed of the selected vehicle and the detected type of the event candidate. A conversation decision tree may be employed by the remote computing device to generate the at least one question. If the speed of the vehicle is below a particular speed, the generated questions may be more detailed, otherwise the generated questions may be less detailed. In some embodiments, the particular speed may be 30 miles per hour, 15 miles per hour, or another suitable speed. In a variation of these embodiments, the particular speed may be changeable based on known road conditions. When the remote computing device determines that the event candidate information is sufficient and unambiguous, the event candidate may be changed to an event in the database and the remote computing device may transmit the event to devices within vehicles in the vicinity of the location of the event candidate.

The above-mentioned embodiments provide advantages over existing systems including, but not limited to: obtaining additional information about an event candidate when the provided information is insufficient or ambiguous; eliminating false events such as, for example, false collisions; obtaining more detail about an event candidate such that when a corresponding event is reported to other devices in other vehicles, operators of the vehicles know what to expect and can decide to take an alternate route, etc.

An embodiment in which occupants of slower moving vehicles are asked more detailed questions in a dialogue than operators of faster moving vehicles is advantageous to safety of the vehicle and its occupants by requiring less focus on the asked questions for operators of faster moving vehicles so as not to distract the operators to a dangerous degree.

In another embodiment, devices in vehicles within a particular distance of an event candidate and traveling toward a location of the event candidate are considered as candidates for a dialog to obtain missing event candidate information.

Yet another embodiment in which the remote computing device predicts when a vehicle selected for a dialog will be within viewing distance of a location of an event candidate has an advantage over existing systems such that an occupant of the selected vehicle may be asked questions while being able to view the event candidate.

An example environment 100 for use with present invention embodiments is illustrated in FIG. 1. Specifically, environment 100 may include multiple devices 104 in respective vehicles, a network 102 and a remote computing device 106. Devices 104 and remote computing device 106 may be remote from each other and may communicate over network 102. Network 102 may be a wireless network and may be implemented by any number of any suitable communications media such as a public data switched network (PSDN), a radio frequency network, a satellite communication network, a network of networks such as the Internet, or other types of networks or combinations thereof. Remote computing device 106 may be a server in some embodiments. The server may be a single computing device or a server farm including multiple computing devices.

Although FIG. 1 shows three devices 104 and only one remote computing device 106, actual operating environments may have more or fewer remote computing devices 106 and more or fewer devices 104.

Embodiments of the invention may be implemented on device 104 in a vehicle, remote computing device 106, or a combination of device 104 and remote computing device 106. In some embodiments, device 104 and remote computing device 106 may have access to a same map for determining a location.

Figure 2:
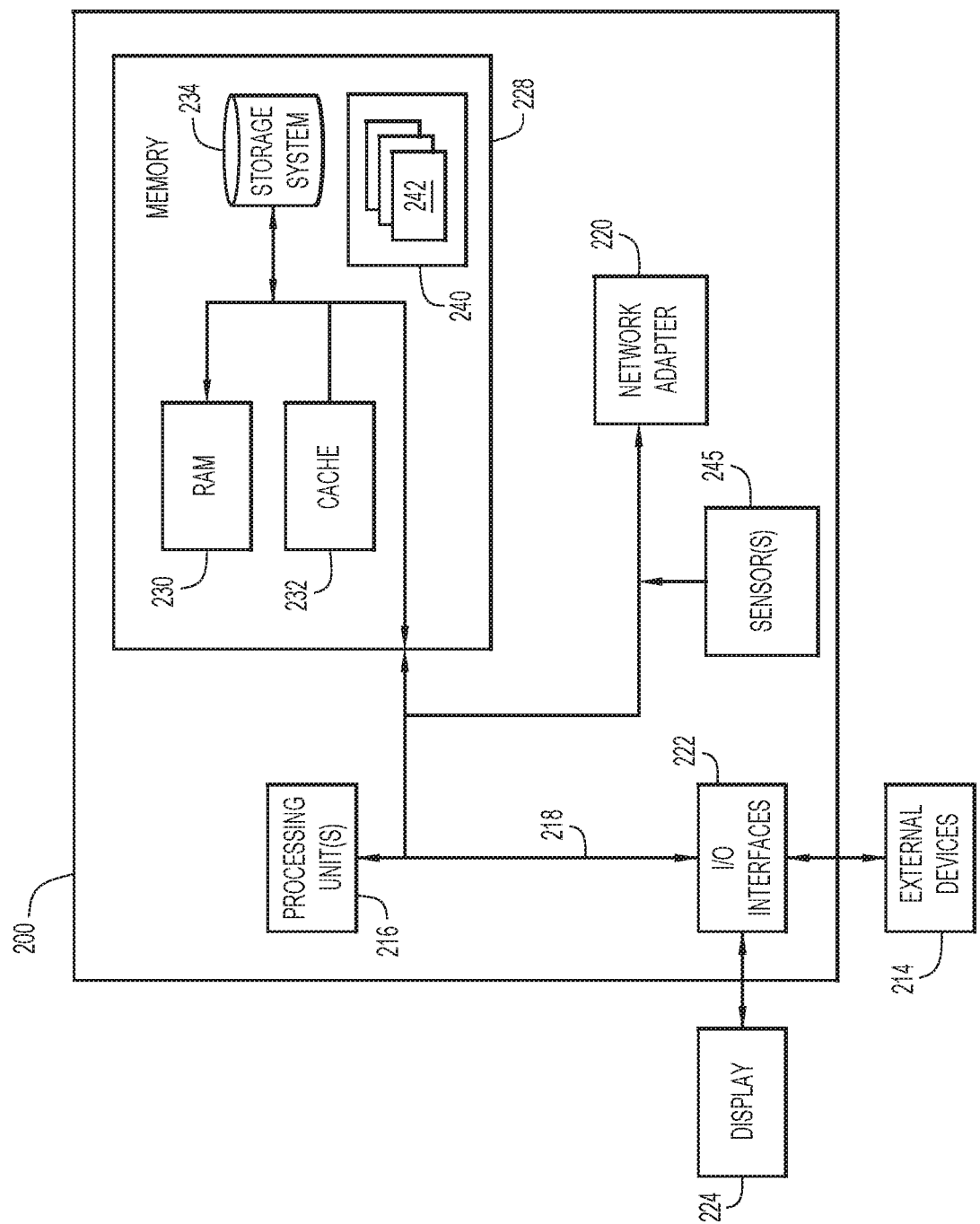
FIG. 2 illustrates an example computer system for implementing a computing device or a device within a vehicle according to embodiments of the invention.

Referring now to FIG. 2, a schematic of an example computer system 200 is shown, which may implement device 104 or remote computing device 106 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk such as, for example, a "floppy disk", and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having at least one program module that is configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices such as a network card, modem, etc. that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), a public switched data network (PSDN) and/or a public network such as, for example, the Internet, via network adapter 220. As depicted, network adapter 220 communicates with the other components of computer system 200 via bus 218. When computer system 200 implements device 104, computer system 200 may include one or more sensors 245 connected to bus 218 to detect a possible event on or near a road. Sensors 245 may include, but not limited to, an image capturing device such as, for example, a camera, an accelerometer, LIDAR, etc. Image processing may be performed on the captured images in order to detect and identify a type of possible event on or near a road. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
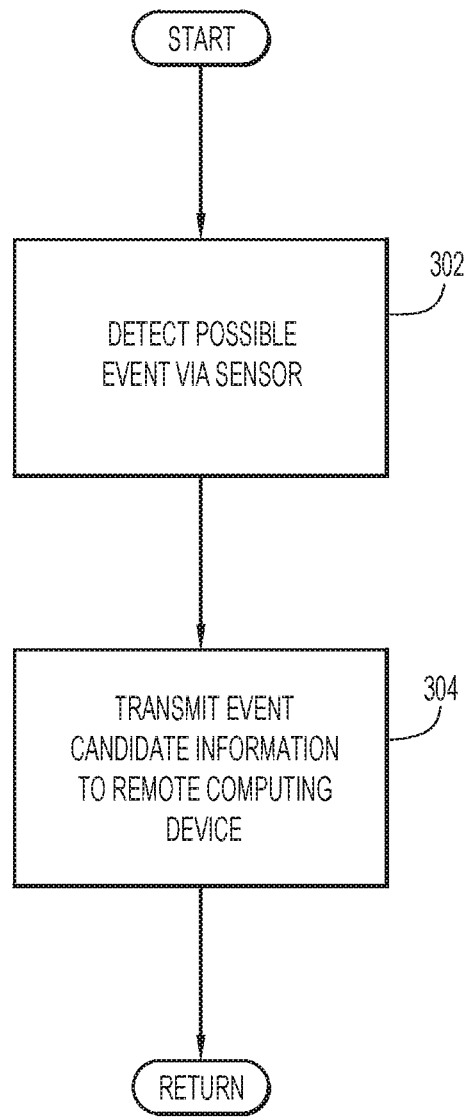
FIG. 3 is a flowchart illustrating example processing of a device within a vehicle according to embodiments of the invention.

FIG. 3 is a flowchart that illustrates an example process that may be performed by 104 in a vehicle in various embodiments. The process may begin with device 104 detecting an event candidate via at least one sensor 245 (act 302). As much information as possible may be determined based on the detected event candidate. For example, device 104 may detect an obstacle on a road. If, for example, at least one sensor 245 provides an image of the detected obstacle, image processing may determine that the obstacle is not a vehicle. In this case, device 104 may transmit event candidate information to remote computing device 106 via network 102 (act 304). The event candidate information may include a location of an event candidate, in this case the obstacle, and information indicating that the obstacle is not a vehicle. The process then may be completed.

Figure 4:
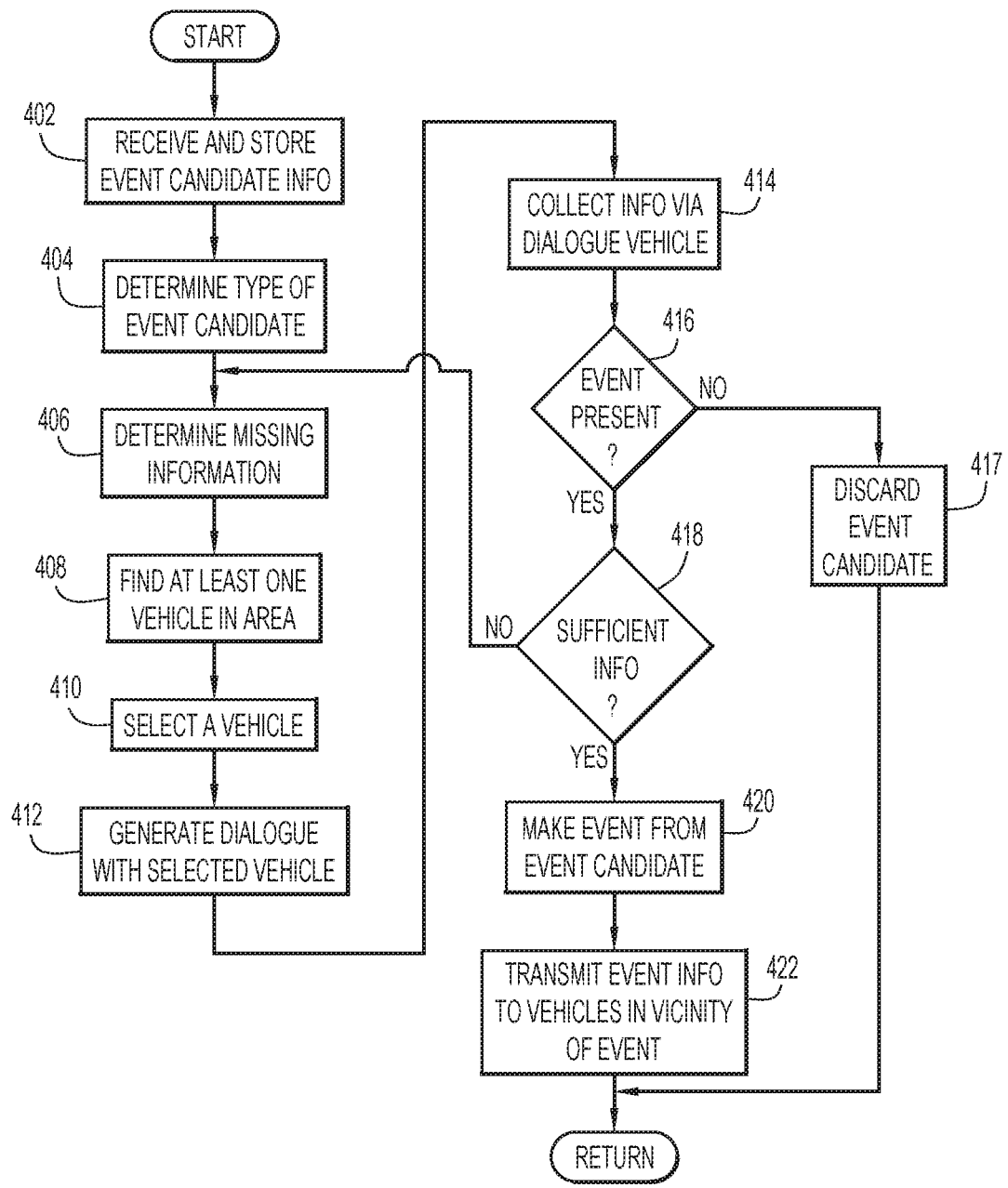
FIG. 4 is a flowchart illustrating example processing of a computing device according to embodiments of the invention receiving event candidate information, determining that the received event candidate information is either insufficient or ambiguous, and generating a dialogue with an occupant of a vehicle to obtain information to resolve any insufficiencies or ambiguities regarding the event candidate information.
Figure 5:
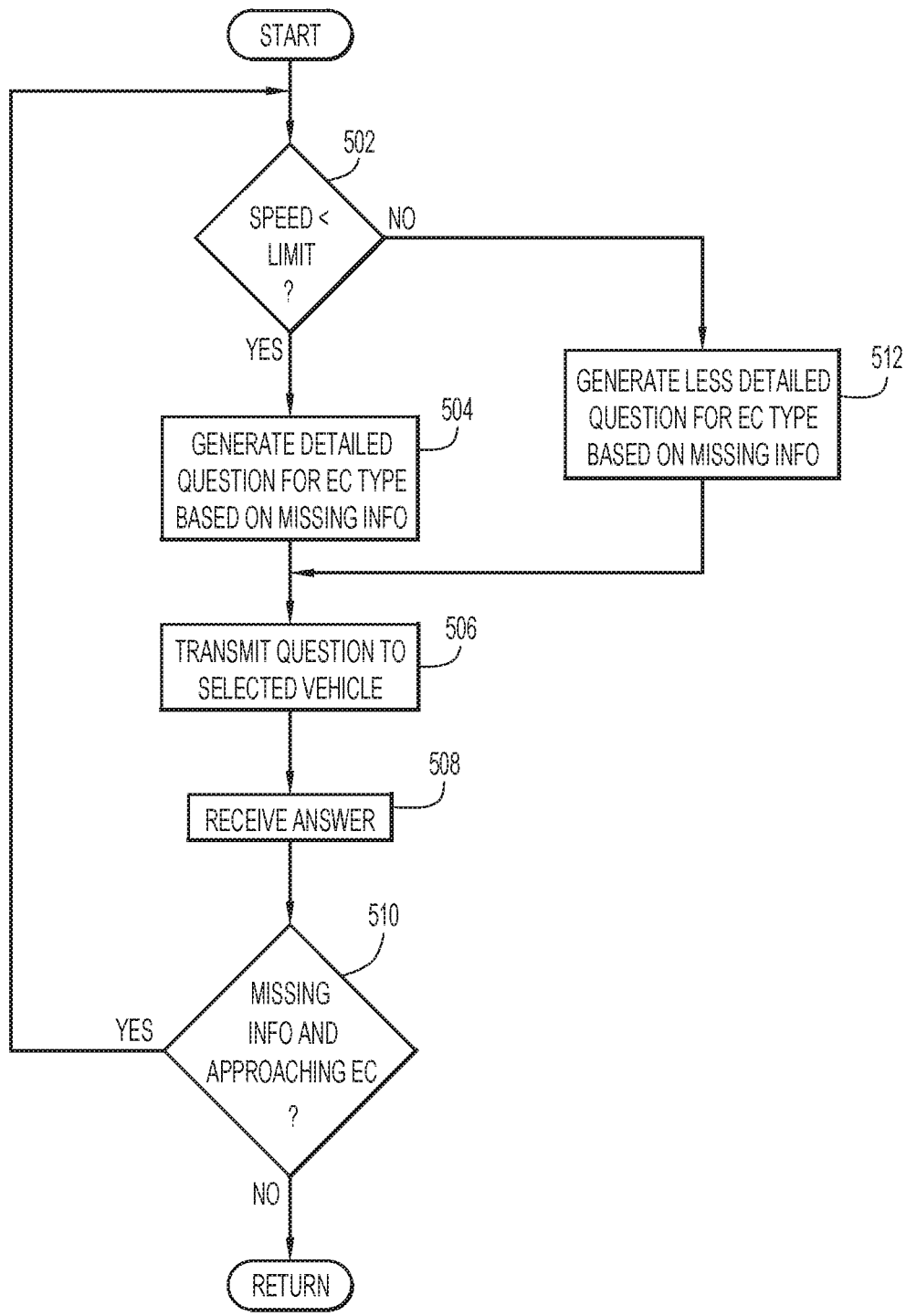
FIG. 5 is a flowchart illustrating example processing of a computing device according to embodiments of the invention regarding generation of questions for a dialogue with an occupant of a vehicle in order to resolve any ambiguities or insufficiencies of stored event candidate information.

FIG. 4 is a flowchart illustrating example processing performed by remote computing device 106 when event candidate information is received from device 104 in a vehicle according to embodiments. The process may begin with remote computing device 106 receiving and storing the event candidate information (act 402). The event candidate information may be stored as an event candidate in a database accessed by remote computing device 106.

Based on the received event candidate information, remote computing device may determine a type of the event candidate (act 404). For example, if the received event candidate information indicates that an obstacle that is not a vehicle is in a roadway, then remote computing device 106 may determine that the type of the event candidate is an obstacle. If the received event candidate information indicates that, for example: multiple vehicles are clustered unusually close together; one or more vehicles are deformed and/or are in an unusual orientation such as, for example, lying on its side or resting on its roof; one or more vehicles are off to a side of the road and may be touching another object, etc., then the event candidate may be determined to be a vehicle collision. If the received event information indicates that one or more vehicles were observed moving in an unusual manner and a road appears to be wet, covered with snow, or covered by ice, then remote computing device 106 may determine that the event candidate is of a type indicating a slippery road condition. The above example types of event candidates are not intended to be a complete list of the various types. Further, other embodiments may include additional types or other types of event candidates.

Remote computing device 106 then may examine the event candidate information and determine whether any information is insufficient or ambiguous in view of the detected event candidate type (act 406). For example, if the event candidate type is a vehicle collision and the event candidate information is silent regarding whether any vehicle damage was detected, then remote computing device 106 may determine that at least some of the event candidate information is missing or insufficient.

Next, remote computing device 106 may find at least one vehicle in a vicinity of a location of the event candidate (act 408). Preferably, remote computing device 106 may find a vehicle at the location of the event candidate, or a vehicle within a particular distance of the location of the event candidate and moving toward the location of the event candidate. Remote computing device 106 may find the at least one vehicle via any one of a number of methods in various embodiments. For example, in one embodiment, device 104 may periodically transmit location and speed information to remote computing device 106. The location and speed information may be transmitted, for example, every 30 seconds, every 60 seconds, or another suitable time period. In another embodiment, when remote computing device 106 attempts to find at least one vehicle in the vicinity of the location of the event candidate, remote computing device 106 may broadcast a signal to devices 104 requesting location, heading and speed information for vehicles that include devices 104 and are located in a particular area such as, for example, the vicinity of the location of the event candidate. Vehicles having respective devices 104 responding to the broadcast become candidate vehicles with respect to remote computing device 106 (act 408).

Remote computing device 104 may then select a vehicle from among the candidate vehicles taking into consideration a probability of a respective vehicle occupant in respective candidate vehicles participating in a dialogue with remote computing device 106 and a predicted time at which the respective vehicle candidates will reach the location of the event candidate (act 410).

The above methods for determining candidate vehicles and selecting a vehicle from among the candidate vehicles are only example methods that may be used in various embodiments. Of course, in other embodiments other methods may be employed to determine candidate vehicles and to select a vehicle from among the candidate vehicles.

After remote computing device 106 selects a vehicle, remote computing device 106 may request a dialogue with vehicle device 104 in the selected vehicle, to which a vehicle occupant may indicate acceptance of the dialogue by using a voice command, touching an icon on a display screen of device 104, depressing a button on device 104, or via other methods. Remote computing device 106 may generate one or more questions for the dialogue depending on the determined type of the event candidate and insufficient and/or ambiguous information (act 412). In some embodiments, the generated questions may depend on a speed of the selected vehicle, as will be discussed in more detail below. During the dialogue, remote computing device 106 may collect information provided by the occupant of the selected vehicle (act 414).

Based on the event candidate information, supplemented by the collected information from the dialogue, remote computing device may then determine whether the event candidate represents an actual event or is a false alarm (act 416). If the event candidate is the false alarm, or is not actually present, then the event candidate information may be discarded (act 417) and the process may be completed. No event will be generated.

If, during act 416, remote computing device 106 determines that the event candidate may be an actual event, or is present, then remote computing device 106 may determine whether the event candidate information is sufficient and not ambiguous (act 418). If remote computing device 106 determines that the event candidate information is sufficient and not ambiguous, then remote computing device 106 may change the event candidate to an event (act 420) and may transmit event information to vehicles in the vicinity of the location of the event (act 422). The process may then be completed. If, during act 418, remote computing device 106 determines that the event candidate information is insufficient or ambiguous, then acts 406 through 416 may be performed again.

Figure 6:
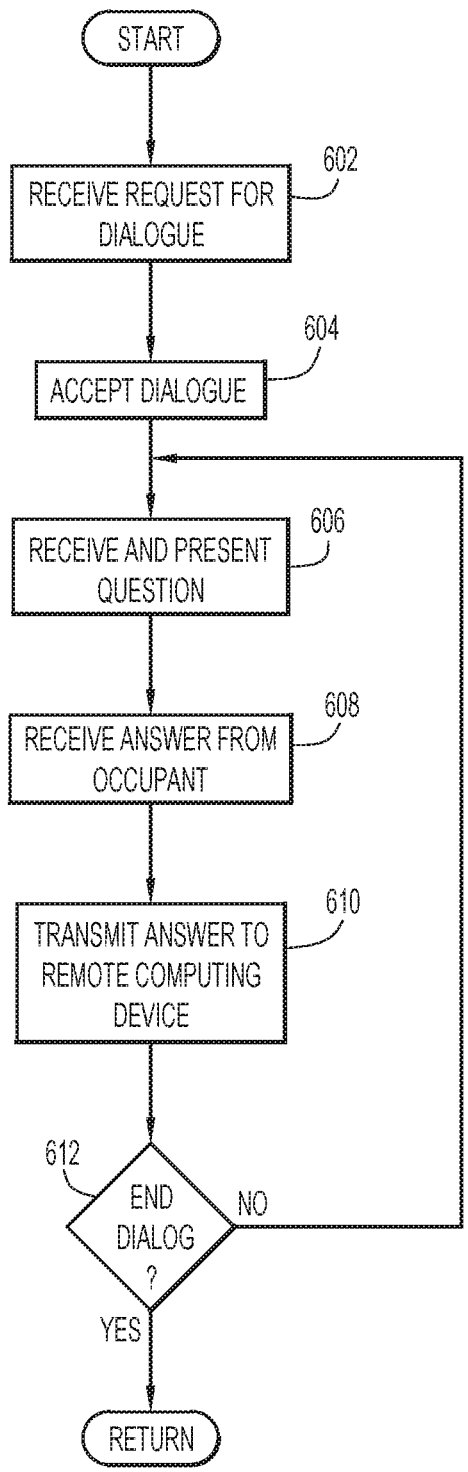
FIG. 6 is a flowchart illustrating example processing of a device within a vehicle according to embodiments of the invention with respect to accepting a dialogue, receiving and presenting questions regarding a possible event, receiving answers to the questions, and transmitting the answers to a remote computing device.

FIG. 6 is a flowchart of an example process performed by remote computing device 106 in some embodiments to generate one or more questions for a selected vehicle (associated with act 412) and to process one or more corresponding answers. The process may begin by determining whether the selected vehicle is traveling less than a particular speed (act 502). The particular speed may be 30 mph, 15 mph, or another suitable speed. If the selected vehicle is traveling less than the particular speed, then remote computing device 106 may generate a detailed question regarding the determined event candidate type based on the insufficient or ambiguous information (act 504). Remote computing device 106 may then transmit the question to device 104 in the selected vehicle, which may present the question either on a display screen or via computer-generated speech to a vehicle occupant (act 506). Device 104 may receive an answer from the vehicle occupant, preferably, via speech and a microphone of device 104, and may transmit the answer to remote computing device 106, which receives the answer (act 508). Remote computing device 106 may perform natural language processing on the received answer in order to extract information and may store at least some of the extracted information with respect to the event candidate in the database. Remote computing device 102 may determine whether the event candidate still has insufficient or ambiguous information and whether the selected vehicle is continuing to approach the location of the event candidate (act 510). If remote computing device 106 determines that the event candidate information does have insufficient or ambiguous information and the selected vehicle is continuing to approach the location of the event candidate, then acts 502-510 may be performed again. Otherwise, the process may be completed.

If, during act 502, remote computing device 106 determines that the selected vehicle is not traveling less than the particular speed, then remote computing device 106 may generate a less detailed question than a question for a vehicle traveling below the particular speed, where the question is based on the event candidate type and the insufficient or ambiguous event candidate information (act 512). Acts 506 through 510 may be performed again as previously described.

FIG. 6 is a flowchart of an example process that may be performed by device 104 in a vehicle when receiving a request for a dialogue from remote computing device 106 (associated with act 508). The process may begin with device 104 receiving a request for a dialogue from remote computing device 106 (act 602). When a vehicle occupant indicates acceptance of the dialogue request, device 104 transmits the acceptance to remote computing device 106 (act 604). Device 104 then may receive and present a question regarding an event candidate from remote computing device 106 (act 606). The question may depend on a type of the event candidate and insufficient or ambiguous information regarding the event candidate. The information may be presented as text via a display of device 104 or as computer-generated speech via a speaker of device 104. Device 104 may receive an answer from an occupant of a vehicle including device 104 (act 608) and may transmit the answer to remote computing device 106 (act 610). The occupant may provide the answer to device 104 as a text message, or preferably, as speech via a microphone of device 104. Either device 104 or remote computing device 106 may perform natural language processing of the answer. Device 104 then may determine whether the dialogue has completed (act 612). If so, the process may be completed. Otherwise, acts 606-612 may be performed again.

Figure 7:
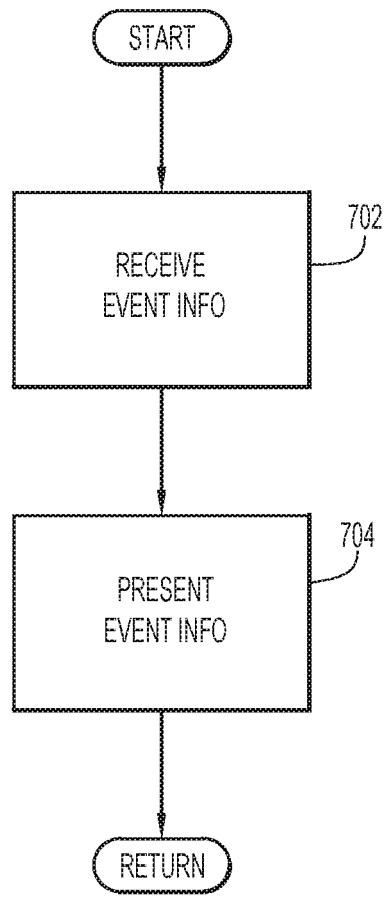
FIG. 7 is a flowchart illustrating example processing of a device within a vehicle according to embodiments of the invention that receives event information from a remote computing device and presents the event information to an occupant of a vehicle.

FIG. 7 is a flowchart of an example process that may be performed by device 104 in a vehicle when receiving event information regarding an event from remote computing device 106 (associated with act 422). The process may begin by receiving event information from remote computing device 106 via network 102 (act 702). Device 104 may then present the event information to an occupant of a vehicle including device 104 (act 704). The event information may be presented in textual form on a display of device 104 or, preferably, device 104 may present the event information as computer generated speech via a speaker of device 106. The computer generated speech may be generated either by remote computing device 106 and transmitted to device 104, or the computer generated speech may be generated by device 104 based on a signal or message received from remote computing device 106. The process may then be completed.

Figure 8:
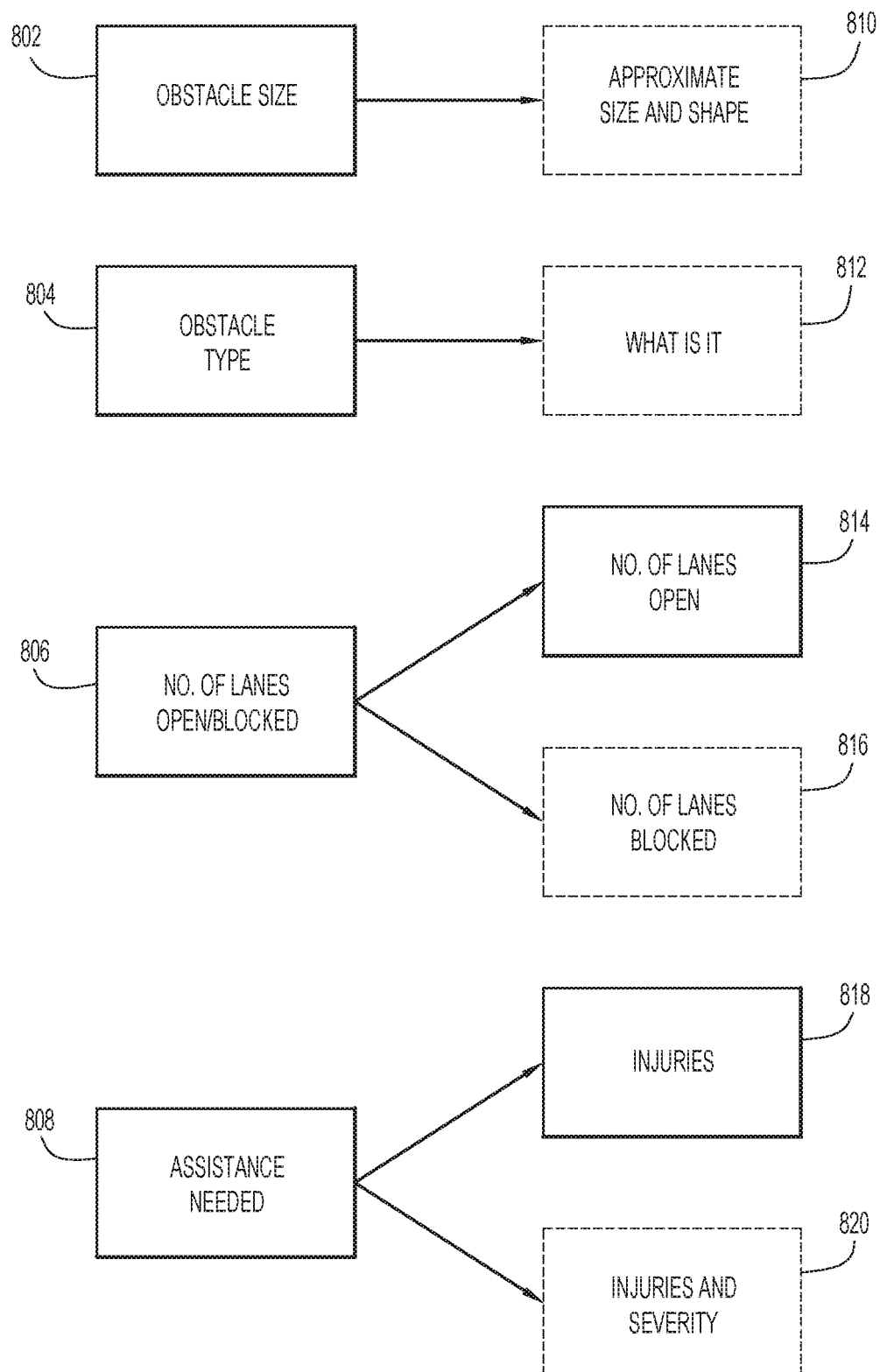
FIGS. 8-10 illustrate example information that may be collected during a dialogue regarding, respectively, an event candidate of an obstacle in the road type, a vehicle collision type, and a road condition type according to embodiments of the invention.
Figure 9:
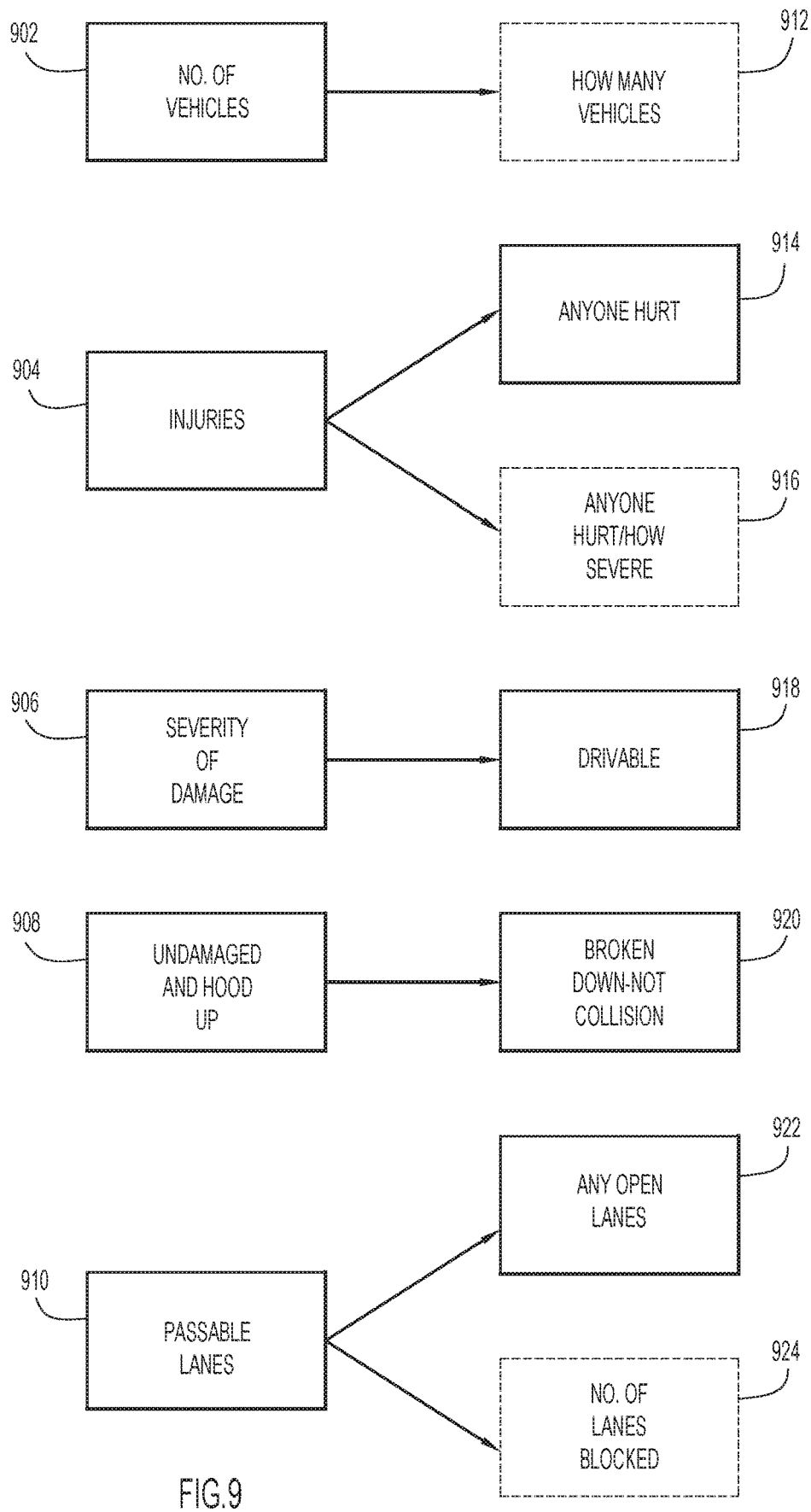
Figure 10:
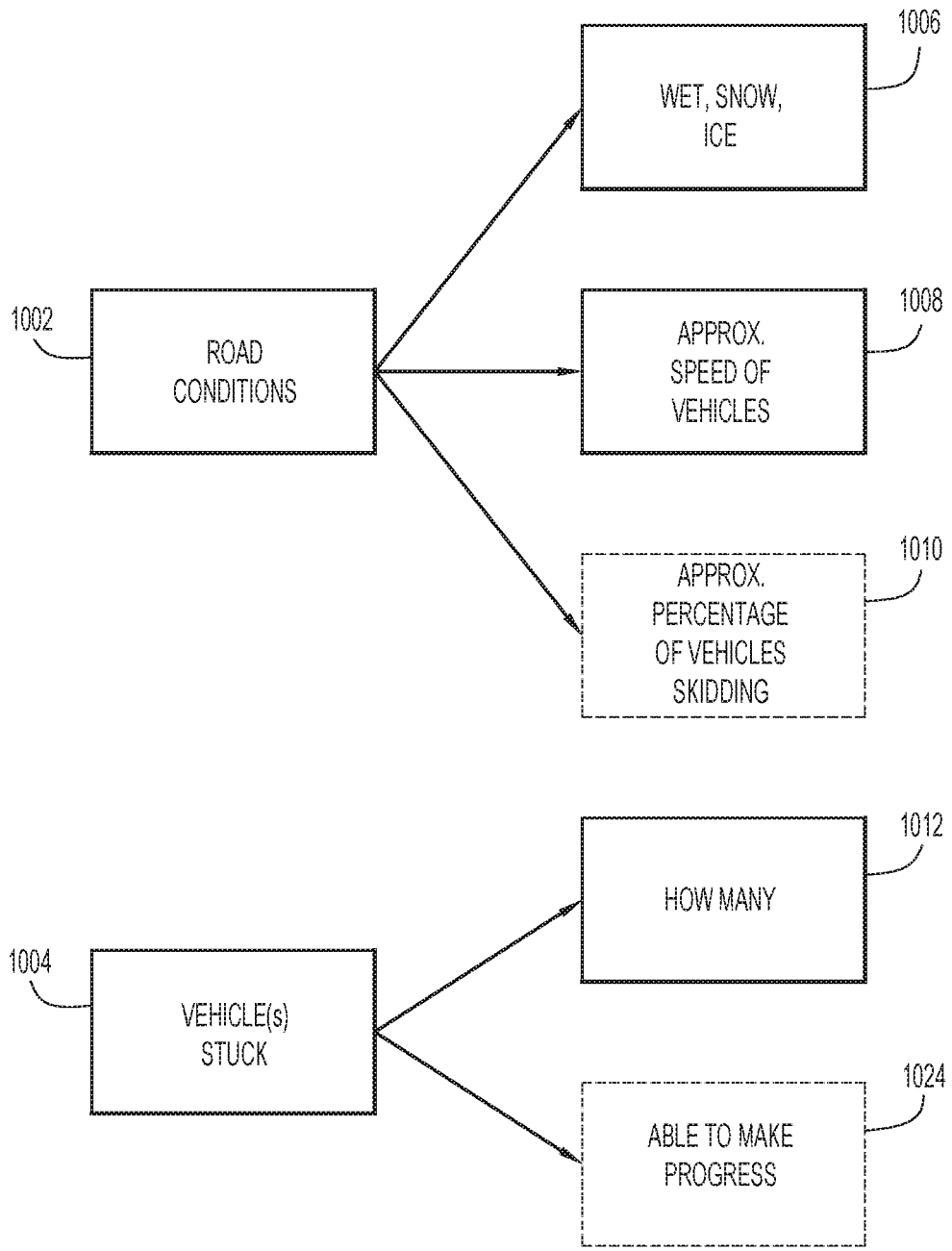

As previously mentioned, event candidates may be of one of a number of different types. For example, event candidate types may include, but not be limited to, an obstacle on a road, a vehicle collision, and a slippery road condition. FIGS. 8-10 are example conversation decision trees regarding, respectively, the obstacle on a road event candidate type, the vehicle collision event candidate type, and the slippery road condition event candidate type. In FIG. 8, information that may be included in event candidate information concerning an event candidate of the obstacle on a road type sent from device 104 in a vehicle to remote computing device 106, may include an obstacle size 802, an obstacle type 804, number of lanes opened or blocked 806, and whether assistance is needed 808. For example, if an event candidate of the obstacle on a road type lacks any one of information concerning items 802-808, then remote computing device 106 may select a vehicle from among a number of candidate vehicles, may request a dialogue, and may generate one or more questions regarding any insufficient or ambiguous event candidate information. Further, the one or more generated questions may depend on whether a speed of the selected vehicle is below a particular speed or greater than or equal to the particular speed. Thus, this embodiment has an advantage over existing advanced drive systems such that when a selected vehicle is traveling greater than or equal to the particular speed, less detailed questions may be asked so as to avoid distracting a vehicle operator to a dangerous degree. Items 810, 812 and 816 of FIG. 8 show more detailed types of questions, as indicated by rectangles with dashed lines, that remote computing device 106 may generate based on insufficient or ambiguous event candidate information when the selected vehicle is a slower moving vehicle traveling at a speed less than the particular speed.

As shown in FIG. 8, when additional information regarding an obstacle size 802 is desired, remote computing device may ask an occupant in the slower moving vehicle about an approximate size and shape of the obstacle 810. When information regarding an obstacle type 804 is desired, remote computing device may ask an occupant in the slower moving vehicle what the obstacle is 812. When information regarding a number of lanes being opened or blocked is desired, remote computing device 106 may ask the occupant in the slower moving vehicle to provide information regarding a number of lanes blocked 816.

When information about a number of lanes being open or blocked 806 is desired, remote computing device 106 may ask an occupant in a faster moving vehicle about a number of lanes opened on the road 814. When information about whether assistance is desired 808, remote computing device 106 may ask the occupant in the faster moving vehicle whether anyone appears to be injured 818, and may further ask the occupant in the slower moving vehicle about injuries and the severity 820.

In FIG. 9, information that may be included in event candidate information concerning an event candidate of the vehicle collision type sent from device 104 in a vehicle to remote computing device 106, may include a number of vehicles involved 902, whether anyone is injured 904, severity of vehicle damage 906, whether a vehicle is undamaged with its hood up 908, and whether any lanes are passable 910. For example, if the event candidate having the vehicle collision type lacks any one of information concerning items 902-910, then remote computing device 106 may select a vehicle from among a number of candidate vehicles, may request a dialogue, and may generate one or more questions regarding insufficient or ambiguous event candidate information. Further, as previously mentioned, the one or more generated questions may depend on whether a speed of the selected vehicle is below the particular speed or greater than or equal to the particular speed. Items 912, 916 and 924 of FIG. 9 show more detailed types of questions, as indicated by rectangles with dashed lines, that remote computing device 106 may generate based on insufficient or ambiguous event candidate information when the selected vehicle is a slower moving vehicle traveling at a speed less than the particular limit.

As shown in FIG. 9, when additional information regarding a number of vehicles involved 902 is desired, remote computing device 106 may ask an occupant in the slower moving vehicle how many vehicles are involved 912. When information regarding injuries 904 is desired, remote computing device 106 may ask the occupant in the slower moving vehicle whether anyone is hurt and how severe the injuries appear to be 916. When information regarding a number of passable lanes 910 is desired, remote computing device 106 may ask the occupant in the slower moving vehicle to provide information regarding a number of lanes blocked 924.

When information about injuries 904 is desired, remote computing device 106 may ask an occupant in a faster moving vehicle whether anyone appears to be hurt 914. When information about severity of vehicle damage 906 is desired, remote computing device 106 may ask the occupant in the faster moving vehicle whether the involved vehicles appear to be drivable 918. When information regarding whether a vehicle is undamaged with its hood up 908 is desired, remote computing device 106 may ask the occupant of the faster moving vehicle if the vehicle appears to be broken down and not involved in a collision 920. When information regarding whether any lanes are passable 910, remote computing device 106 may ask the occupant in the faster moving vehicle whether any lanes are open 922.

In FIG. 10, information that may be included in event candidate information concerning an event candidate of the slippery road condition type sent from device 104 in a vehicle to remote computing device 106, may include a road condition 1002 and whether any vehicles are stuck 1004. For example, if the event candidate having the slippery road condition type lacks any one of information concerning items 1002-1004, then remote computing device 106 may select a vehicle from among a number of candidate vehicles, may request a dialogue, and may generate one or more questions regarding insufficient or ambiguous event candidate information. Further, as previously mentioned, the one or more generated questions may depend on whether a speed of the selected vehicle is below the particular speed or greater than or equal to the particular speed. Items 1010 and 1024 of FIG. 10 show more detailed types of questions, as indicated by rectangles with dashed lines, that remote computing device 106 may generate based on insufficient or ambiguous event candidate information when the selected vehicle is a slower moving vehicle traveling at a speed less than the particular speed.

As shown in FIG. 10, when additional information regarding a road condition 1002 is desired, remote computing device 106 may ask an occupant in the slower moving vehicle about an approximate percentage of vehicles skidding 1010. When information regarding stuck vehicles 1004 is desired, remote computing device 106 may ask the occupant in the slower moving vehicle whether the vehicle(s) is/are able to make progress on the slippery road 1024.

When information about a road condition 1002 is desired, remote computing device 106 may ask an occupant in a faster moving vehicle whether the road is wet, snow-covered, or ice-covered 1006 and the approximate speed of vehicles 1008. When information regarding stuck vehicles is desired 1004, remote computing device 106 may ask the occupant in the faster moving vehicle how many vehicles appear to be stuck 1012.

It should be noted that, in the above descriptions regarding FIGS. 8-10, in addition to occupants of slower moving vehicles being asked more detailed questions than occupants of faster moving vehicles, the occupants of the slower moving vehicles also may be asked the same less detailed questions as the occupants of the faster moving vehicles in addition to the more detailed questions. Thus, only the occupants of the slower moving vehicles may be asked the more detailed questions while occupants in the slower moving vehicles and the faster moving vehicles may be asked the less detailed questions.

Figure 11:
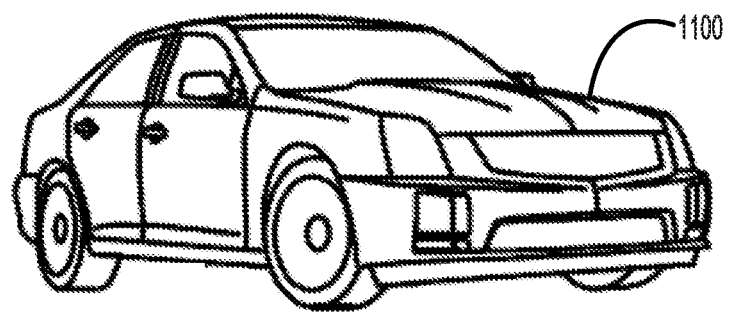
FIG. 11 shows an example vehicle that includes a device according to embodiments of the invention.

FIG. 11 illustrates an example vehicle 1100 that includes device 104 according to embodiments of the invention.

It will be appreciated that the embodiments described above and illustrated in the drawings represent only a few of the many ways of implementing the various embodiments of the invention.

The environment of the present invention embodiments may include any number of computer or other processing systems such as client or end-user systems, server systems, etc. and databases or other repositories arranged in any desired fashion, where the present invention embodiments may be applied to any desired type of computing environment such as cloud computing, client-server, network computing, mainframe, etc. The computer or other processing systems employed by the present invention embodiments may be implemented by any number of any personal or other type of computer or processing system such as desktop, laptop, PDA, mobile devices, etc., and may include any commercially available operating system and any combination of commercially available and custom software such as, for example, browser software, communications software, and server software. These systems may include any types of monitors and input devices such as keyboard, mouse, voice recognition, etc. to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium such as a LAN, WAN, Intranet, Internet, hardwire, modem connection, wireless, etc. For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium, such as magnetic or optical media, magneto-optic media, floppy diskettes, CD-ROM, DVD, memory devices, etc., of a stationary or portable program product apparatus or device for use with systems connected by a network or other communications medium.

The communication network may be implemented by any number of any type of communications network such as a LAN, WAN, Internet, Intranet, VPN, etc. The computer or other processing systems of the present invention embodiments may include any conventional or other communications devices to communicate over the network via any conventional or other protocols. The computer or other processing systems may utilize any type of connection, such as a wired, wireless, etc., for access to the network. Local communication media may be implemented by any suitable communication media such as a local area network (LAN), hardwire, wireless link, Intranet, etc.

The system may employ any number of any conventional or other databases, data stores or storage structures, such as files, databases, data structures, data or other repositories, etc., to store information. The database system may be implemented by any number of any conventional or other databases, data stores or storage structures, such as files, databases, data structures, data or other repositories, etc., to store information. The database system may be included within or coupled to the server and/or client systems. The database systems and/or storage structures may be remote from or local to the computer or other processing systems, and may store any desired data.

The present invention embodiments may employ any number of any type of user interface, such as a Graphical User Interface (GUI), command-line, prompt, etc., for obtaining or providing information, where the interface may include any information arranged in any fashion. The interface may include any number of any types of input or actuation mechanisms, such as buttons, icons, fields, boxes, links, etc., disposed at any locations to enter/display information and initiate desired actions via any suitable input devices such as a mouse, keyboard, etc. The interface screens may include any suitable actuators, such as links, tabs, etc., to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, such as light pulses passing through a fiber-optic cable or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method of verifying and distributing information about a possible event, the method comprising:

storing, by a computing device, at least some received event candidate information concerning the possible event as an event candidate in a database;

generating, by the computing device, a dialogue with an occupant of a vehicle located in a vicinity of the possible event to obtain and store information to resolve any insufficiency or ambiguity regarding the event candidate in the database, a level of detail of questions asked during the dialogue depending on a speed of the vehicle;

making, by the computing device, an event in the database from the event candidate when the information stored in the database regarding the event candidate is determined to be sufficient and unambiguous; and reporting, by the computing device, the event to at least one vehicle approaching a location corresponding to the event.

2. The method of claim 1, wherein the generating a dialogue further comprises:

determining at least one vehicle in the vicinity of the possible event traveling toward a location of the possible event and a probability of an occupant of the at least one vehicle participating in a dialogue; and selecting one of the at least one vehicle as the vehicle with which the computing device generates the dialogue based on the probability and a predicted time at which the one of the at least one vehicle reaches the location of the possible event.

3. The method of claim 1, wherein the questions asked by the computing device during the dialogue are based on a conversation decision tree.

4. The method of claim 3, further comprising:

collecting, by the computing device, information from the dialogue;

storing, by the computing device, at least some of the collected information regarding the event candidate in the database; and repeatedly performing, by the computing device, as long as the information regarding the event candidate is determined to be either insufficient or ambiguous:

generating another respective dialogue with a respective occupant of another respective vehicle located in the vicinity of the possible event to obtain and store information to resolve any insufficiencies or ambiguities with respect to the event candidate, collecting information from the another respective dialogue, and storing at least some of the collected information regarding the event candidate in the database.

5. The method of claim 1, further comprising:

performing natural language processing on portions of the dialogue received by the computing device to determine and extract information received during the dialogue.

6. The method of claim 1, further comprising:

determining a type of the event based on the information stored in the database regarding the event candidate.

7. A system for verifying and distributing information about a possible event, the system comprising:

at least one processor; and at least one memory connected to the at least one processor, the at least one processor being configured to perform:

storing at least some received event candidate information concerning a possible event as an event candidate in a database;

generating a dialogue with an occupant of a vehicle located in a vicinity of the possible event to obtain and store information to resolve any insufficiency or ambiguity regarding the event candidate in the event database, a level of detail of questions asked during the dialogue depending on a speed of the vehicle;

making an event in the database from the event candidate when the information stored in the database regarding the event candidate is determined to be sufficient and unambiguous; and reporting the event to at least one vehicle approaching a location corresponding to the event.

8. The system of claim 7, wherein the generating a dialogue further comprises:

determining at least one vehicle in the vicinity of the possible event traveling toward a location of the possible event and a probability of an occupant of the at least one vehicle participating in a dialogue; and selecting one of the at least one vehicle as the vehicle with which the system generates the dialogue based on the probability and a predicted time at which the one of the at least one vehicle reaches the location of the possible event.

9. The system of claim 6, wherein the questions asked by the system during the dialogue are based on a conversation decision tree.

10. The system of claim 9, wherein the at least one processor is further configured to perform:

collecting information from the dialogue;

storing at least some of the collected information regarding the event candidate in the database; and repeatedly performing as long as the information regarding the event candidate is determined to be either insufficient or ambiguous:

generating another respective dialogue with a respective occupant of another respective vehicle located in the vicinity of the possible event to obtain and store information to resolve any insufficiencies or ambiguities with respect to the event candidate, collecting information from the another respective dialogue, and storing at least some of the collected information regarding the event candidate in the database.

11. The system of claim 8, wherein the at least one processor is further configured to perform natural language processing on portions of the received dialogue to determine and extract information received during the dialogue.

12. The system of claim 8, wherein the at least one processor is further configured to perform:

determining a type of the event based on the information stored in the database regarding the event candidate.

13. A computer program product comprising at least one computer readable storage medium having computer readable program code embodied therewith for execution on at least one processor of a computing device, the computer readable program code being configured to be executed by the at least one processor to perform:

storing at least some received event candidate information concerning a possible event as an event candidate in a database;

generating a dialogue with an occupant of a vehicle located in a vicinity of the possible event to obtain and store information to resolve any insufficiency or ambiguity regarding the event candidate in the event database, a level of detail of questions asked during the dialogue depending on a speed of the vehicle;

making an event in the database from the event candidate when the information stored in the database regarding the event candidate is determined to be sufficient and unambiguous; and reporting the event to at least one vehicle approaching a location corresponding to the event.

14. The computer program product of claim 13, wherein the generating a dialogue further comprises:

determining at least one vehicle in a vicinity of the possible event traveling toward a location of the possible event and a probability of an occupant of the at least one vehicle participating in a dialogue; and selecting one of the at least one vehicle as the vehicle with which the at least one processor generates the dialogue based on the probability and a predicted time at which the one of the at least one vehicle reaches the location of the possible event.

15. The computer program product of claim 14, wherein the computer readable program code is further configured to be executed by the at least one processor to ask the questions during the dialogue based on a conversation decision tree.

16. The computer program product of claim 15, wherein the computer readable program code is further configured to be executed by the at least one processor to perform:

collecting information from the dialogue;

storing at least some of the collected information regarding the event candidate in the database; and repeatedly performing as long as the information regarding the event candidate is determined to be either insufficient or ambiguous:

generating another respective dialogue with a respective occupant of another respective vehicle located in the vicinity of the possible event to obtain and store information to resolve any insufficiencies or ambiguities with respect to the event candidate, collecting information from the another dialogue, and storing at least some of the collected information regarding the event candidate in the database.

17. The computer program product of claim 13, wherein the computer readable program code is further configured to be executed by the at least one processor to perform:

performing natural language processing on portions of the received dialogue to determine and extract information received during the dialogue.

18. The computer program product of claim 13, wherein the computer readable program code is further configured to be executed by the at least one processor to perform:

determining a type of the event based on the information stored in the database regarding the event candidate.

* * * * *